United States Patent Office 3,290,358
Patented Dec. 6, 1966

3,290,358
ALKYLARYL-SUBSTITUTED POLYVINYL ALCO-
HOLS AND ESTER DERIVATIVES
Ernest L. Pollitzer, Hinsdale, Ill., assignor to Universal
Oil Products Company, Des Plaines, Ill., a corporation
of Delaware
No Drawing. Filed Dec. 31, 1962, Ser. No. 248,295
5 Claims. (Cl. 260—488)

This invention relates to surface active agents consisting of compositions containing a hydrophilic polyvinyl alcohol substituted on one of the terminal vinyl groups of the vinyl alcohol polymer by a hydrophobic hydrocarbon radical containing at least 8 carbon atoms and to the process of preparing a surface active composition containing said hydrophilic polyvinyl alcohol radical. More specifically, this invention concerns a substituted polyvinyl alcohol containing from 2 to about 20 hydroxyethyl groups substituted on one of the terminal vinyl groups of the polyvinyl chain by a hydrophobic hydrocarbon substituent containing at least 8 carbon atoms per hydrophobic radical.

One object of this invention is to provide a process for preparing a surface active agent useful in a variety of solvents including water and organic solvents, depending upon its molecular composition. It is another object of this invention to prepare an essentially non-ionic surface active agent of entirely organic composition which is adapted for use as an emulsifying agent for water-insoluble organic compounds and in applications in which inorganic components cannot be tolerated in the system.

In one of its embodiments this invention relates to a process for the production of a surface active agent which comprises condensing an alkylatable alkylaromatic compound containing at least 8 carbon atoms per molecule with a polyvinyl alcohol ester containing from 3 to about 20 vinyl units per molecule and thereafter hydrolyzing the resulting condensation product of said ester and said hydrocarbon whereby the multiple ester linkages in said polyvinyl radical are converted to said surface active agent comprising a polyvinyl alcohol substituted on one of the carbon atoms of a terminal vinyl group by the alkylaryl hydrocarbon portion of said compound.

Another embodiment of this invention relates to a surface active agent consisting of a polyvinyl alcohol containing from 3 to about 20 vinyl units per molecule and substituted on one of the carbon atoms of the terminal vinyl unit by a hydrophobic alkylaromatic radical containing from 8 to about 18 carbon atoms.

It is generally known that for a composition of matter to possess the property of surface activity or detergency in an aqueous or nonaqueous solvent, the substance must have in its molecular structure a so-called hydrophobic (water repulsing or fat-soluble) radical bonded to a hydrophilic (water-soluble, fat-repulsing) group at generally the opposite ends of the molecule or at positions within the molecular structure that enable such groups to orient themselves in solution to form micelles in which all of the hydrophobic radicals of a group of detergent molecules arrange themselves in a regular, side-by-side arrangement and all of the hydrophilic radicals of the same molecules of detergent also orient themselves in an insular or coplanar arrangement. Such formation of micelles which is essential to detergent activity takes place when the concentration of detergent in solution is at a critical level sufficient to form said micelles. The formation of micelle aggregates by compounds containing a hydrophobic group bonded to a hydrophilic group when the concentration of the compound in solution attains a certain critical level will occur only if the hydrophilic effect of the polar portion of these compounds in solution substantially balances the hydrophobic effect of the hydrocarbon portion of the molecule. The hydrophilic group can neither be too polar nor the hydrocarbon portion of the surface active agent be too hydrophobic if the product is to be an effective surface active agent. These compositions are capable of acting as detergents or surface active agents when dissolved in a solvent compatible with the composition when the hydrophobic portion of the micelle dissolves in its aggregate total mass the fatty portion of the "soil" and the hydrophilic portion of the micelle is sufficiently hydrophilic to carry the aggregate mass including the hydrophobic group and the soil into solution or colloidal suspension.

The present surface active agents are a special class of compounds having the foregoing structure, containing a hydrophilic group consisting of an aliphatic chain of carbon atoms containing multiple, polar hydroxyl radicals and a hydrophobic portion comprising an alkylaryl hydrocarbon radical, which within certain limits hereinafter specified substantially balances the effect of the hydrophilic portion of the molecule when the product is dissolved in an aqueous or nonaqueous solvent and forms micelles when dissolved in such solvents. Certain species of the present invention usable in nonaqueous media such as hydrocarbon or chlorine-substituted hydrocarbon solvents contain a relatively large hydrocarbon radical such as an alkyl naphthalene group, whereas the water-soluble species hereof contain a relatively smaller alkyl-substituted benzene hydrophobic radical. The hydrophilic portion of the present detergent and surface active compositions is characterized as a vinyl alcohol polymer containing multiple hydrophilic hydroxyl groups (i.e., up to about 20 or more hydroxyethyl units for species of the product requiring a large hydrophilic group to balance the effect of a large hydrophobic radical such as an octadecyl phenyl derivative and as few as 3 hydroxyethyl units for species of the present composition in which the hydrophobic hydrocarbon portion is smaller, such as an octylphenol group). The following structural formulae represent products of this invention:

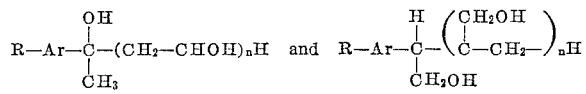

$$R-Ar-\overset{OH}{\underset{CH_3}{C}}-(CH_2-CHOH)_nH \quad \text{and} \quad R-Ar-\overset{H}{\underset{CH_2OH}{C}}-\left(\overset{CH_2OH}{\underset{}{C}}-CH_2-\right)_nH$$

in which R—Ar— is the hydrophobic alkylaryl hydrocarbon portion of the present composition —Ar— being selected from the group consisting of the mono- and bicyclic aromatic radicals, R is an alkyl group containing from 5 to about 18 carbon atoms and $n$ has an average value of from 2 to about 19, representing the total average number of hydroxyethyl units in the hydrophilic portion of the surface active molecule.

The present surface active products, certain species of which are detergents active in aqueous solutions and certain other species of which are active in nonpolar solvents such as hydrocarbon and chlorohydrocarbon solvents, are synthesized in the present process by condensing an alkyl aromatic hydrocarbon or alkylphenol containing a nuclearly replaceable hydrogen atom with a polyvinyl alcohol ester having the number of vinyl alcohol ester groups required to provide the source of the poly-hydroxyethyl radical when subsequently hydrolyzed in the present reaction which will be sufficiently hydrophilic to yield a product having surface activity. In the alkylation step the alkyl-aromatic compound utilized as starting material is prepared by way of synthesis from more common starting materials or separated from a naturally occurring source, such as petroleum, or from a petroleum conversion products. A class of surface active agents which have the property of reducing the surface tension of water, without, however, necessarily having detergent properties (that is, the capacity of suspending in an aqueous solution fatty and oleaginous soiling agents) are produced from short chain alkyl aromatic hydrocarbons of both mono- and binuclear structure in which the alkyl group or groups substituted on the aromatic nucleus contain up to an aggregate total of about 8 carbon atoms per molecule, such as mono-butyl-, amyl-, hexyl- and octylbenzenes, toluenes and phenols. The alkylaromatic starting materials which contain a long chain alkyl group produce detergents capable of emulsifying fatty and oleaginous soiling agents on fabrics when condensed with the present polyvinyl alcohol hydrophilic groups of sufficient water solubilizing effect to yield products having detergency, including such typical alkyl-aromatic compounds as the mono-octyl-, nonyl-, decyl-, dodecyl-, tetradecyl-, hexadecyl- and octadecyl-substituted benzene, toluene, xylene, naphthalene and methylnaphthalene hydrocarbons.

The alkyl aromatic hydrocarbons utilized as one of the starting materials in the present process are generally prepared synthetically in a preliminary alkylation process in which an aromatic compound such as benzene, or toluene, naphthalene, phenol, xylenol, etc. (each of which contains a nuclearly replaceable hydrogen atom, replaced by the entering alkyl group during the alkylation reaction), is condensed with an alkylating agent containing an alkyl group having the number of carbon atoms required to provide the desired hydrophobic group in the final detergent product. These alkylating agents are referred to herein as "olefin-acting," including the olefins themselves, the alkyl halides and alcohols which contain the desired transferable long chain alkyl group in the structure of the compound, including such illustrative examples as: octane-1, octanol, nonene (such as propylene trimer recovered from a propylene polymerization product as the nonene boiling range fraction), nonyl monochloride recovered from a mono-chlorinated nonane, dodecene, (such as propylene tetramer or butylene trimer), lauryl alcohol (dodecanol), pentadecene, (such as propylene pentamer), or a mixture of the foregoing mono-olefinic hydrocarbons, such as a propylene polymer fraction having a boiling range corresponding to the $C_{10}$–$C_{15}$ olefins (e.g., a propylene tetramer fraction boiling from 175° to 225° C.) as well as the monochlorinated paraffins, such as a Keryl chloride fraction recovered from a chlorinated kerosene product.

The alkylation of aromatic compounds with olefin-acting alkylating agents to form the alkylaryl compound comprising one of the present starting materials herein is effected in a preliminary stage of the process utilizing an alkylation reaction which is promoted by certain catalytic agents well-known in the prior art utilizing well-known alkylation procedures. Typical alkylation catalysts are of the acid-acting type capable of forming a carbonium ion in the reaction mixture, including such typical representative catalysts as concentrated or anhydrous liquid hydrogen fluoride, sulfuric acid containing at least 90 percent by weight of sulfuric acid, an anhydrous aluminum halide such as aluminum chloride (particularly when the alkylating agent is an alkyl halide), boron trifluoride and other well-known acidic catalysts for this purpose. The desired end product of the alkylation reaction is a mono-alkylated aromatic compound (that is, containing a single long chain alkyl group introduced via the alkylation reaction). The formation of such mono-alkylates is enhanced when the molar ratio of the aromatic reactant to the alkylating agent is at least 2 to 1 and more preferably from about 5 to 1 to about 20 to 1, or more, the excess of aromatic reactant being recovered from the alkylation reaction mixture, generally by distillation. Temperatures of from −10° to about 50° C. and pressures sufficiently superatmospheric to maintain the reactants and catalyst in essentially liquid phase provide operable conditions for production of the alkyl aromatic starting material. The mono-alkylate is usually separated from the crude alkylation product by fractional distillation, the desired monoalkylate generally having a relatively narrow boiling range. Thus, dodecylbenzene formed by alkylating benzene with an olefin-acting alkylating agent such as propylene tetramer, including the various isomers formed from the double bond position isomers present in the olefinic fraction, boils at a temperature of from about 325° to about 345° C. which may include alkylates having alkyl groups containing from 10 to about 15 carbon atoms per long chain alkyl group. The mono-alkylates of dinuclear aromatic compounds, such as the alkylates of naphthalene, methylnaphthalene, an alpha- or beta-naphthol, etc. are preferably alkylated with alkylating agents containing from 4 to about 8 carbon atoms when the ultimate surface active product of this invention is to have detergency. Binuclear aromatic alkylates in which the alkyl group contains more than about 8 carbon atoms, although surface active in aqueous and nonaqueous solvents, are more appropriately used as emulsifying and wetting agents rather than detergents because of the preponderant effect of the hydrophobic hydrocarbon portion on the resulting surface active product. Although the aromatic compound initially involved in forming the long chain alkylate via the preliminary alkylation process is selected on the basis of not only being alkylatable in the immediate alkylation reaction in which the long chain alkyl group is substituted on the aromatic nucleus, but the choice of aromatic compound is also controlled by factors which obtain in the succeeding stages of the process and one of these factors is its subsequent alkylatability with the polyvinyl alcohol ester which forms the intermediate from which the ultimate surface active product is prepared. Thus, the aromatic nucleus must contain a sufficient number of substitutable (i.e., nuclearly replaceable) hydrogen atoms to be capable of accepting the essential hydrophilic substituent during alkylation with the polyvinyl alcohol ester reactant. The selection of the initial aromatic compound for the preliminary alkylation reaction is also restricted to aromatics in which the nuclear substituents already present on the ring will not sterically hinder the substitution of the polyvinyl ester group on the aryl nucleus during the subsequent condensation-alkylation stage of the process; these alkylatable aromatics are generally limited to individuals containing not more than two, and preferably not more than one, nuclear substituents; thus, the aromatic reactant may be xylene or a cresol but more preferably is benzene, toluene or phenol.

The polyvinyl alcohol ester reactant utilized in the condensation of the aforementioned alkylaromatic compound with the polyvinyl alcohol ester (the condensation reaction also being an alkylation-type of reaction mechanism) to form an intermediate ester alkylate which yields the present surface active product upon subsequent hydrolysis must also be pre-synthesized in a preliminary stage of the process to provide an ester polymer having the required number of vinyl alcohol ester units which when subsequently hydrolyzed will be capable of exerting sufficient hydrophilic effect to be appropriate for the particular alkyl aromatic starting material. Thus, products having surface activity, but not necessarily detergency, such as wetting agents, leather degreasing agents, textile dye assistants, penetrating agents and emulsifying agents, are prepared from alkyl aromatic starting materials in which the hydrophobic group is the predominant portion of the product molecule, such as the long chain alkyl-substituted naphthalenes, the poly-alkyl-substituted benzenes and the mono-alkyl-substituted benzenes in which the alkyl substituent on the aromatic nucleus contains from 15 to 18 carbon atoms per group generally require polyvinyl alcohol ester alkylating agents in which the average number of vinyl groups per molecule is in the upper region of the range of from 3 to about 20 in order to provide watersoluble products. On the other hand, ultimate products for use in nonaqueous solvents such as hydrocarbon dry cleaning solvents contain a relatively short chain hydrophilic substituent in which the average number of vinyl units per polymer is in the lower region of the range of from 3 to about 20; the preponderant hydrocarbon group in the product molecule weights the relative effects of the hydrophilic-hydrophobic groups in favor of the hydrophobic portion of the surface active agent. Accordingly, the number of alkoxyethyl units in the polyvinyl alcohol ester utilized as alkylating agent in the production of the present surface active agent is predetermined prior to the condensation reaction with the alkyl aromatic starting material in order for the ultimate product to meet the requirements of the type of surface active product to be formed in the present process. The polyvinyl alcohol ester is therefore selectively formed and in effect, tailor-made in a preliminary vinyl alcohol ester polymerization process to form a polymer which meets the requirements set by the character of the surface active product to be formed in the present process.

The usual vinyl alcohol ester monomer employed in preparing the polyvinyl alcohol ester starting material is vinyl acetate beacuse it is generally available and is the least costly of the various acid esters, although other esters such as the formates, propionates, and others are also utilizable as the vinyl ester monomers from which the polymer alkylating agents may be prepared. The monomer ester is polymerized under controlled conditions to yield products consisting predominantly of the desired polymer which contains the required number of vinyl units to yield surface active products, as aforesaid. Control of the polymerization rate or the extent of monomer polymerization generally constitutes the only means of predetermining the molecular weight of the polymer, since individual polymers are not readily separated from the polymerization reaction mixture after completion of the polymerization reaction. The ultimate molecular weight of the vinyl ester polymer is affected by one or more of the several polymerization reaction variables which control the molecular weight of the polymer, including such factors as the use of a diluent of the vinyl ester monomer, controlling the amount of chain initiator present in the reaction mixture or provided by radiation of the reaction mixture, or by incorporating a chain terminator in the reaction mixture, with the monomer undergoing polymerization. Thus, by dissolving the vinyl alcohol ester monomer in a relatively large proportion of an inert solvent, such as an alcohol or an ether, the rate of polymerization is controlled by dispersing the reactive monomer throughout the resulting dilute solution, followed by terminating the polymerization of the monomer at the desired reaction stage. Typical solvents utilized for this purpose include such alcohols as methyl alcohol, ethyl alcohol, propyl and isopropyl alcohols, etc., ethers such as diethyl ether, methylethyl ether, di-isopropyl ether, etc., esters such as methyl acetate, methyl formate, ethyl acetate, etc., and other solvents for the vinyl ester which do not individually affect the reactants and catalysts involved in the polymerization process. The ratio of solvent to vinyl ester monomer charged into the polymerization reaction is determined by the desired ultimate molecular weight of the polymer formed, large proportions of solvent ester favoring the production of lower average molecular weight polymers and lower proportions of solvent to monomer favoring higher molecular weight polymers. The polymer formed, although individually varying considerably in molecular weights, may be predetermined to provide a product in which a majority of the individuals contain from 3 to about 20 vinyl units and in which the average number of vinyl units per molecule is within the same approximate range. For the purpose of the present invention in which the polymers contain an average of from 3 to about 20 vinyl ester units per molecule, the vinyl ester monomer to solvent ratio may vary from 1 to 1 to 50 to 1 on a volumetric basis.

The polymerization of the vinyl ester monomer is preferably effected in the presence of a catalyst which initially and simultaneously promotes the condensation between adjacent monomers in the reaction mixture and thereby reduces the range of polymer molecular weights present in the polymerization product by initiating a number of polymer chains simultaneously in the reaction mixture, rather than limiting the number of polymer chains initiated and encouraging the condensation of additional monomers with polymer chains already started in the reaction mixture. One of the preferred groups of catalysts utilizable in the polymerization of vinyl esters are the peroxides and the peracids, such as benzoyl peroxide, hydrogen peroxide, peroxy acetic acid, succinic acid peroxide, cinnamoyl peroxide, butyryl peroxide, etc., the peroxide being mixed with the monomer directly at a low temperature or in admixture with the solvent, if utilized, prior to mixing with the vinyl ester monomer to provide a mass polymerization procedure. Other utilizable chain initiators for the polymerization of the vinyl ester monomer are the mineral and organic acids, preferably present in quantities insufficient to hydrolyze the vinyl alcohol ester during the course of the reaction, including such acids as hydrogen chloride vapor, anhydrous aluminum chloride, aluminum iodide or aluminum bromide, phospheric acid, phosphorous trichloride or pentachloride and others, which may be added to the solvent in small quantities to form the chain initiator. The catalyst is present in the reaction mixture in sufficient quantity to simultaneously initiate polymer chains from a major proportion of the vinyl ester monomer present in the reaction mixture and for this purpose catalyst quantities of from 0.1 to 10 percent or higher is recommended.

Another method of controlling the chain length of the polymer formed in the polymerization process comprises the use of an initiator which may be instantaneously withdrawn from the reaction mixture at the appropriate stage of the polymerization. Thus, the polymerization may be initiated by irradiation with ultraviolet light and at the appropriate stage of the process, removing the source of ultraviolet radiation to eliminate further polymerization. Termination of polymer formation when utilizing a catalyst is effected by quenching the process by the addition of water or other solvent to the reaction mixture in which the catalyst is soluble but in which the vinyl ester polymer is insoluble. Such quenching procedure may be utilized in both acid-type and peroxy-type catalyzed processes.

The condensation of the aforementioned, pre-formed polyvinyl alcohol ester with the pre-formed alkylatable alkylaryl compound containing a nuclearly replaceable hydrogen atom to thereby form a condensation product containing a single polyvinyl alcohol ester as a nuclear radical involves a reaction mechanism similar to an alkylation-type of condensation reaction, except that the entering alkyl group attaching itself to the aromatic nucleus is a long, straight chain polymer of repetitive vinyl ester groups containing an acetoxy group on each second carbon atom of the alkyl chain. The condensation reaction is preferably promoted with a catalytic agent which enhances the yield of condensation product, promotes the rate of the condensation and enables the reaction to proceed at a lower temperature. The catalyzed condensation is also controlled to minimize side reactions, such as polyalkylation, etherification and decomposition of the polyvinyl alcohol reactant. Typical catalysts which promote the condensation reaction are members of a group of catalytic agents referred to as acidic and Friedel-Crafts type reagents, particularly such catalysts which are preconditioned by a moderating component having the ability to form a complex with the acidic or Friedel-Crafts component, including such typical examples as zinc chloride and zinc bromide, ferric chloride and ferric bromide, boron trifluoride, boron trichloride, phosphoric acid (especially phosphoric acid composited with a siliceous adsorbent, such as kieselguhr, followed by calcination to form a so-called "solid" phosphoric acid), phosphorous trichloride, phosphorous pentachloride, sulfuric acid, boron trifluoride etherate (a complex of boron trifluoride with from 1 to 3 moles of a dialkyl ether such as dimethyl ether, methylethyl ether, diethyl ether, etc.), aluminum chloride triacetate, hydrogen fluoride-calcium fluoride complex, HF-NaF and KF-HF addition complexes and other Friedel-Crafts type alkylation catalysts.

The condensation of the polyvinyl alcohol ester with the alkylatable aromatic compound in the presence of one of the foregoing catalytic agents is effected at a temperature of from about −10° to about 50° C. and at a pressure sufficient to maintain the reactants and catalyst in essentially liquid phase. The molar ratio of alkylaryl reactant to the polyvinyl ester reactant charged to the condensation stage of the process is from about 1 to 1 to about 3 to 1, the excess aromatic reactant (if any) being recovered from the reaction mixture following completion of the condensation reaction by extracting the aromatic reactant from the condensation product. Such extraction may be effected, for example, by mixing the reaction mixture with a solvent which dissolves the alkyl aromatic compound but not the condensation product, particularly after hydrolyzing the organic acid ester groups from the vinyl alcohol units. Typical of such solvents are hydrocarbons such as benzene, an aliphatic paraffin such as n-pentane etc. Another method of separating excess aromatic reactant from the condensation reaction product and recovery of the latter intermediate comprises neutralizing the catalyst by the addition of a base, such as aqueous caustic or lime, to the condensation reaction mixture, separating the organic phase from the precipitated, neutralized catalyst and fractionally distilling excess aromatic reactant (at reduced pressure if necessary to lower the boiling point) and recovering a residue consisting of the nonvolatilized condensation product. The catalyst is supplied to the reaction in an amount sufficient to provide from about 0.05 to about 0.3 weight proportion of catalyst per unit weight of polyvinyl ester reactant.

The condensation product recovered from the intermediate reaction mixture, after separation of the excess aromatic reactant from the desired product as well as the used catalyst, is an alkylaromatic substituted polyvinyl alcohol ester in which at least a portion of the alkylate-condensate product has one or both of the following empirical structures:

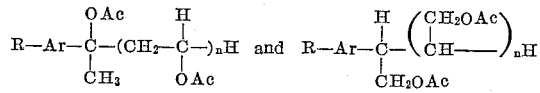

in which R—Ar— represents the hydrophobic alkyl-aromatic portion of the ultimate surface active product, OAc represents an acyloxy radical present in the vinyl alcohol ester polymer to form the alkylating agent in the condensation reaction and $n+1$ represents a number corresponding to the average number of vinyl ester units in the polymer alkylating agent. The present surface active product is prepared from the above intermediate condensation product via the subsequent hydrolysis of the acyloxy groups from the vinyl ester units comprising the polymer alkylating agent in the condensation reaction, thereby converting the ester linkages to free hydroxyl groups and providing the hydrophilic group in the ultimate surface active product requisite to surface activity. Although either acidic or basic hydrolyzing agents may be employed to convert the intermediate vinyl alcohol ester groups to their free vinyl alcohol units, acids are generally preferred because the resulting product formed directly by such hydrolysis is the free alcohol rather than an alkali metal alcoholate formed at least partially when a strong base such as an alkali metal hydroxide (caustic soda, for example) is utilized to hydrolyze the ester linkages. Furthermore, acid hydrolysis yields the esterifying acid as a direct hydrolytic product which may be recovered as the free acid (for example, by distillation from the hydrolysis reaction mixture), suitable for recycle to the production of additional vinyl alcohol ester for subsequent use in producing the polymer ester alkylating agent. Thus, although such alkaline bases as sodium hydroxide, lithium hydroxide and potassium hydroxide are utilizable for the hydrolysis of the ester groups from the intermediate condensation product, mineral acids such as hydrochloric, sulfuric, phosphoric, etc., at concentrations of from about 1 Normal to 30 Normal, or higher result in substantially complete hydrolysis of the ester. Amounts of mineral acid from 0.5 percent to as high as 10 percent by weight of the intermediate ester are effective. Hydrolysis is effected at temperatures of from about 10° to about 100° C. and the desired surface active product in its free form in substantially 100 percent purity (after first distilling off the released organic esterifying acid involved in the ester intermediate from the hydrolysis reaction mixture) is recovered from the hydrolytic reaction mixture. Another method of recovering the free surface active product from the hydrolysis reaction product involves a salting-out procedure which comprises dissolving as much of a water-soluble, hydrate-forming salt such as sodium sulfate, sodium chloride, potassium acetate, sodium phosphate, etc., in the aqueous hydrolytic reaction mixture as the latter will dissolve at a temperature of from about 10° to about 50° C. and thereafter cooling the solution to effect maximum precipitation of the surface active product. The desired hydrolyzed product, as the free alcohol generally separates from the aqueous phase as an oily layer. Instead of recovering the hydrolysis product in its substantially pure form as an alcohol, however, the entire hydrolytic reaction mixture (after removal, for example, by distillation, of the organic acid hydrolytically released from the ester is preferably neutralized with a base to form a salt of the free mineral acid (as well as the esterifying organic acid, too, if not separately recovered) to form an aqueous mixture of salts and the desired surface active product which is suitable for the preparation of a laundering, degreasing or other composition for which the present surface active product is ultimately to be used. Other additives may also be incorporated into the neutralized reaction mixture to form cleaning compositions for specific uses. Thus, detergent compositions are produced by mixing the present product with such additives as sodium tripolyphosphate, sodium carboxymethylcellulose, sodium carbonate, dyes, perfumes, antioxidants, etc., in accordance with detergent formulations well-known in the art.

The products are nonionic materials which vary in specific instances from oils to waxy solids in consistency and from oil-soluble to water-soluble products. Because of their non-ionic character these products are especially effective for uses in which ionic compositions would produce skin sensitivity, etc., as in dishwashing detergents, shampoos, skin creams, etc.

The present invention is further illustrated with respect to several of its specific embodiments in the following examples, which, however, are not intended to limit the generally broad scope of the invention necessarily in accordance therewith.

A series of surface active agents containing various alkylaryl hydrophobic radicals and various polyvinyl alcohol hydrophilic groups set forth in the following Table I are prepared and tested in a Terg-O-Meter utilizing the standard Terg-O-Meter test procedure and dodecylbenzene sulfonate (a sodium sulfonate derivative of the propylene tetramer alkylate of benzene) as a standard (rated at 100) as a basis of comparison. The following description for the preparation of a polyvinyl alcohol alkylate condensation product of benzene is typical of the procedure utilized for the other condensation products set forth in Table I, except for specific reactants and reactant proportions utilized in the preparations; the description for the indicated benzene derivative synthesis is therefore generally applicable to the description of the preparative technique for the other derivatives enumerated in Table I; to avoid repetition their preparation will accordingly not be specifically set forth.

Vinyl acetate (Dow Chemical Co. USP 98%) is converted to a polymer mixture containing polyvinyl acetates in which the average number of vinyl units is from about 7 to about 15 and about 76 percent are polymers in which the number of vinyl units/molecule is from about 10 to about 12, by dibenzoyl peroxide-catalyzed polymerization of vinyl acetate in a large volume of methyl-acetate solvent. The vinyl acetate polymer is recovered from the methyl acetate solution by distillation of the solvent from the polymer residue.

Other polymers containing an average of from 3 to about 20 vinyl alcohol units with a spread in the number of units for specific polymers ranging from 3 to 5 per polymer are prepared by increasing the proportion of solvent and catalyst (which reduces the average molecular weight of the polymer) or by decreasing the proportion of solvent and catalyst in the reaction mixture (producing higher molecular weight polymers when accompanied by longer reaction periods, measured by U.V. exposures). The resulting polyvinyl alcohol ester is reserved for use as alkylating agent in its condensation with benzene, as follows:

A benzene alkylate of the foregoing polyvinyl alcohol ester is formed by mixing 1.5 molar proportions of benzene with each mole of polyvinyl alcohol ester, based on an average molecular weight of the polyvinyl ester of 11. The mixture of benzene and polyvinyl alcohol ester is mixed with sufficient borontrifluoride trietherate (diethyl ether) to yield a mixture containing 2 percent by weight of the borontrifluoride etherate, based on the benzene present in the reaction mixture. The polymer-benzene-catalyst mixture is maintained at 20° C., at a pressure of 100 pounds per square inch for a reaction period averaging about 30 minutes and then cooled to 0° C. with a salt-ice pack surrounding the reaction flask. The free polyvinyl alcohols are liberated from their acetate esters by refluxing the polyvinyl acetate with 5 percent by weight of 6 Normal hydrochloric acid and taking overhead the liberated acetic acid with the volatilized hydrochloric acid until the theoretical quantity of acetic acid has been taken overhead and the residue is free of hydrogen chloride. Ten cc. of water for each 100 cc. of the residue is then added to the mixture, forming a 2-phase mixture which settles into an upper hydrocarbon layer and a lower catalyst-alkylate layer, the lower layer being withdrawn into a distillation flask from which the boron trifluoride and any ether present is removed by distillation. The product residue is an oily substance, soluble in water which foams when shaken with water.

A 0.1 percent solution of the foregoing product at 140° F. when submitted to a detergency evaluation test (i.e., compared with a 0.3 percent aqueous solution of a built sodium dodecyl benzene sulfonate detergent composition containing 30 percent by weight of S.D.B.S., sodium sulfate, sodium tripolyphosphate and sodium carboxymethylcellulose) in accordance with the standard Terg-O-Meter test procedure (which duplicates the reciprocating, circular agitation of most domestic laundering apparatus) has a relative detergency of 118 percent. The test fabric and soiling procedure, standardized for the Terg-O-Meter involved cotton muslin swatches soiled with "oildag," comprising a mixture of carbon black and mineral oil. The comparative laundering ability of the standard and test sample is determined by measuring the reflectance of white light from the laundered swatches, using a reflectometer.

Other products prepared by the foregoing procedure have the properties indicated in the following Table I:

TABLE I.—SURFACE ACTIVE PROPERTIES OF THE ALKYLATES OF POLYVINYL ALCOHOL AND ALKYLARYL COMPOUNDS

| Alkylating Agent, Average No. of Vinyl Alcohol Units | Aryl Compound in Alkyl-Aryl Portion | Alkyl Substituent on Aryl Nucleus | Surface Active Properties of Product |
|---|---|---|---|
| 8 | Benzene | Nonyl | Detergency of series <Std.; maximum at 12 vinyl units |
| 12 | do | do | |
| 18 | do | do | |
| 18 | do | do | |
| 8 | do | Dodecyl | Detergency: 101% of Std. |
| 12 | do | do | Detergency: 118% of Std. |
| 15 | do | do | Detergency: 116% of Std. |
| 18 | do | do | Detergency: 113% of Std. |
| 20 | do | do | Detergency: 98% of Std. |
| 8 | do | Pentadecyl | Detergency: <Std. |
| 12 | do | do | Detergency: 100% of Std. |
| 15 | do | do | Detergency: 105% of Std. |
| 18 | do | do | Detergency: 108% of Std. |
| 20 | do | do | Detergency: 101% of Std. |
| 10 | Naphthalene | Amyl | Detergency of series <Std. Products are efficient wetting and degreasing agents |
| 15 | do | do | |
| 18 | do | do | |
| 22 | do | do | |
| 10 | do | Octyl | Detergency of series <than amyl series; less soluble in H₂O; soluble in n-hexane |
| 15 | do | do | |
| 18 | do | do | |
| 6 | Phenol | Nonyl | Detergency: <Std. |
| 10 | do | do | Detergency: about equal to Std. |
| 15 | do | do | Detergency: 105% of Std. |
| 18 | do | do | Detergency: <Std. |

The products are oils some of which are water-soluble (particularly the benzene and phenol series) and all have the property of reducing the surface tension of water, producing an aqueous solution which foams, but less profusely than the standard S.D.B.S.

I claim as my invention:

1. A polyvinyl alcohol ester of a lower alkanoic acid containing an average of from about 3 to about 20 vinyl alcohol ester units, substituted on one of the carbon atoms of a terminal vinyl group of the polymer by an alkylaromatic radical selected from the group consisting of the mononuclear and binuclear alkylaromatic hydrocarbon radicals and alkyl phenol radicals having a single nuclear alkyl substituent containing from 5 to about 18 carbon atoms.

2. The ester of claim 1 further characterized in that said ester is the acetate.

3. A compound as defined in claim 1 further characterized in that said ester is acetate, formate or propionate.

4. A polyvinyl alcohol containing an average of from about 3 to about 20 vinyl units per molecule and substituted on one of the carbon atoms of a terminal vinyl group by a hydrophobic long chain alkyl-substituted mononuclear or binuclear aromatic hydrocarbon radical containing from 5 to about 18 carbon atoms in the long chain alkyl substituent.

5. A polyvinyl alcohol containing an average of from about 3 to about 20 vinyl units per molecule and substituted on one of the carbon atoms of a terminal vinyl unit by an alkyl phenol radical in which the alkyl substituent on the phenol ring contains from 8 to about 15 carbon atoms.

References Cited by the Examiner

Chemical Abstracts (Sakurada), vol. 47, 1953, 5167.
Chemical Abstracts (Sakurada), vol. 47, 1953, 8395a.
Thomas, C. A., Anhydrous Aluminum Chloride in Organic Chemistry, 1941, p. 479.
Gilman, H., Organic Chemistry, vol. I, 2nd Ed., 1943, p. 755.

LORRAINE A. WEINBERGER, *Primary Examiner.*
V. GARNER, *Assistant Examiner.*